Dec. 11, 1951     L. D. SINGLETON     2,577,820
RECORDING SCALE

Filed June 9, 1947                                          5 Sheets-Sheet 1

*INVENTOR*
LESTER D. SINGLETON.
BY
ATTORNEY.

INVENTOR
LESTER D. SINGLETON.
BY
ATTORNEY

Dec. 11, 1951     L. D. SINGLETON     2,577,820
RECORDING SCALE
Filed June 9, 1947     5 Sheets-Sheet 3
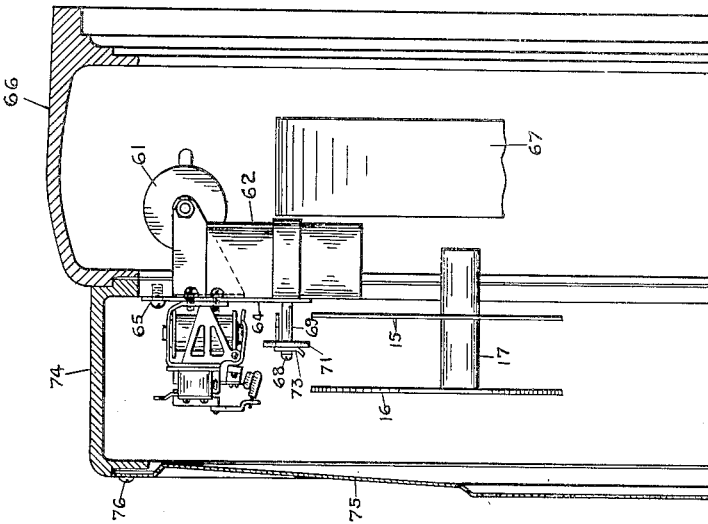
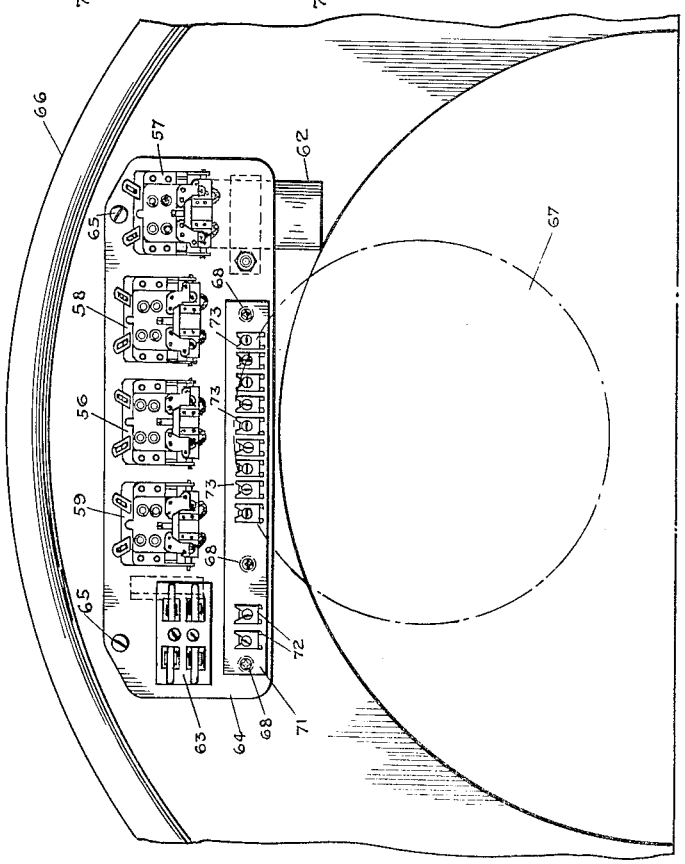
INVENTOR
LESTER D. SINGLETON.
BY
ATTORNEY.

Dec. 11, 1951 L. D. SINGLETON 2,577,820
RECORDING SCALE
Filed June 9, 1947 5 Sheets-Sheet 4

INVENTOR
LESTER D. SINGLETON.
BY
ATTORNEY.

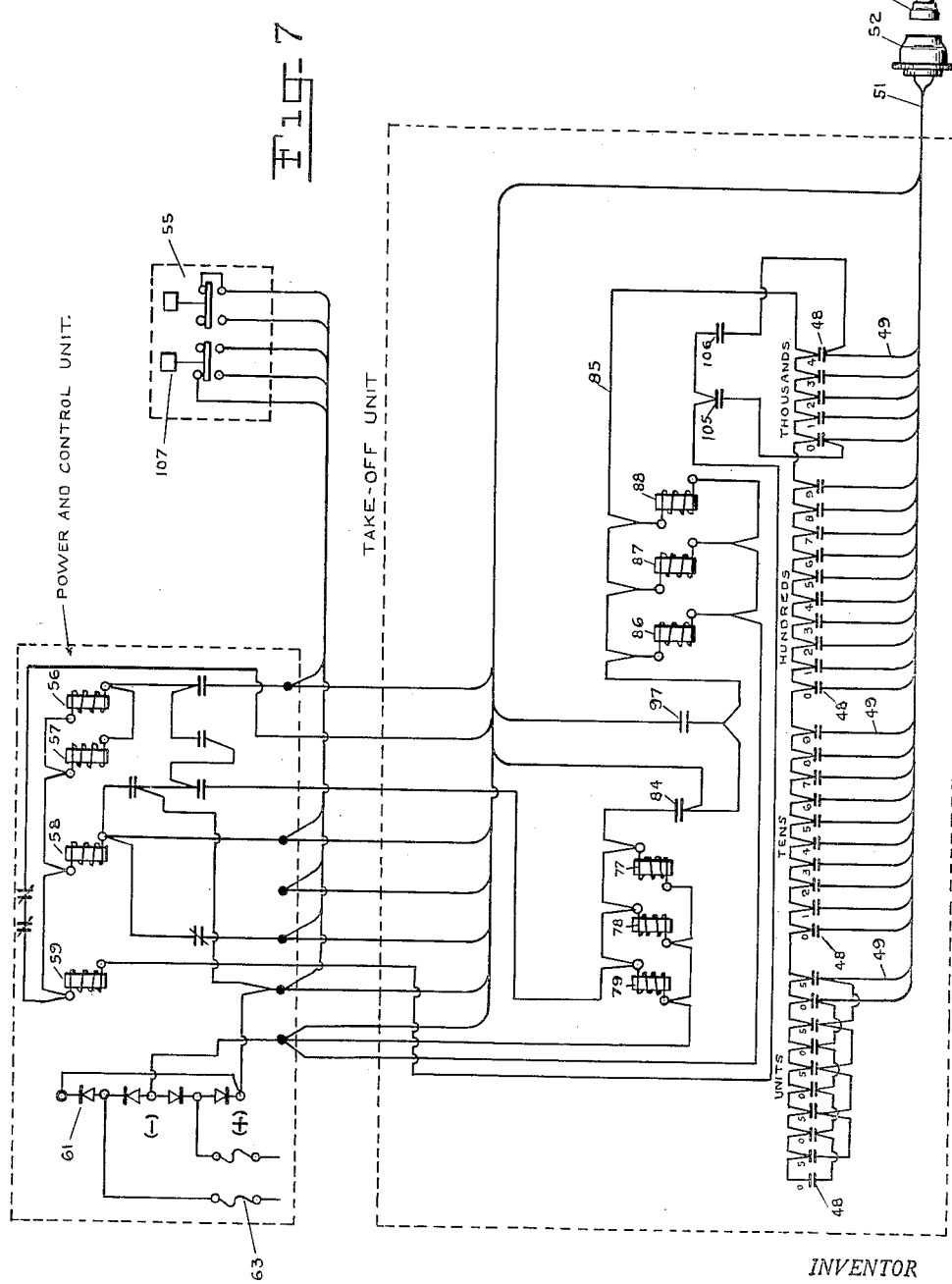

Patented Dec. 11, 1951

2,577,820

UNITED STATES PATENT OFFICE 2,577,820

RECORDING SCALE

Lester D. Singleton, Rutland, Vt., assignor to The Howe Scale Company, a corporation of Vermont Application June 9, 1947, Serial No. 753,473

4 Claims. (Cl. 177—351)

This invention relates to recording scales of the type which give a weight indication of the load and also print a recording of the weight thereof, and relates more particularly to an improved select or mechanism adapted for use with recording scales of the automatic dial type.

In recording scales of the type with which the present invention is concerned, it is essential that the accuracy of the scale be not destroyed by the use of selector mechanism which will interfere with the load counterbalancing mechanism or create friction in movement. It is accordingly an important object of this invention to provide an improved selector mechanism for use with an automatic dial scale which will be relatively simple in construction, and accurate and efficient in use in that it does not interfere with the counterbalancing of the load nor create friction in movement.

Another object of my invention is the provision of an improved selector or take-off mechanism for recording dial scales whereby electrical impulses are transmitted to a suitable indicating or printing apparatus constructed so as to be controlled by such electrical impulses.

A further object of this invention is the provision of a selector or take-off mechanism, for use with recording scales of the automatic dial type, so compact that it may be mounted in the dial head of the usual automatic dial scale with substantially no rearrangement thereof or alteration thereto.

Other objects of this invention, together with certain details of construction and combinations of parts, will appear from the following detailed description and will be pointed out in the claims.

In the drawings wherein a preferred embodiment of our invention is shown,

Fig. 3 is a detail view of the power and control unit of the selector or take-off mechanism, shown mounted in the dial head;

Fig. 4 is a vertical cross-sectional view taken through the dial head and unit shown in Fig. 3;

Fig. 7 is a wiring diagram of the electrical circuit employed in the selector or take-off mechanism.

Like reference characters indicate like parts throughout the several views of the drawings.

The selector mechanism of this invention may be applied to any dial scale, but is particularly adapted to be used with an automatic weighing scale of the type shown and described in application Ser. No. 646,883, filed February 11, 1946 by Lester D. Singleton.

Figure 1:
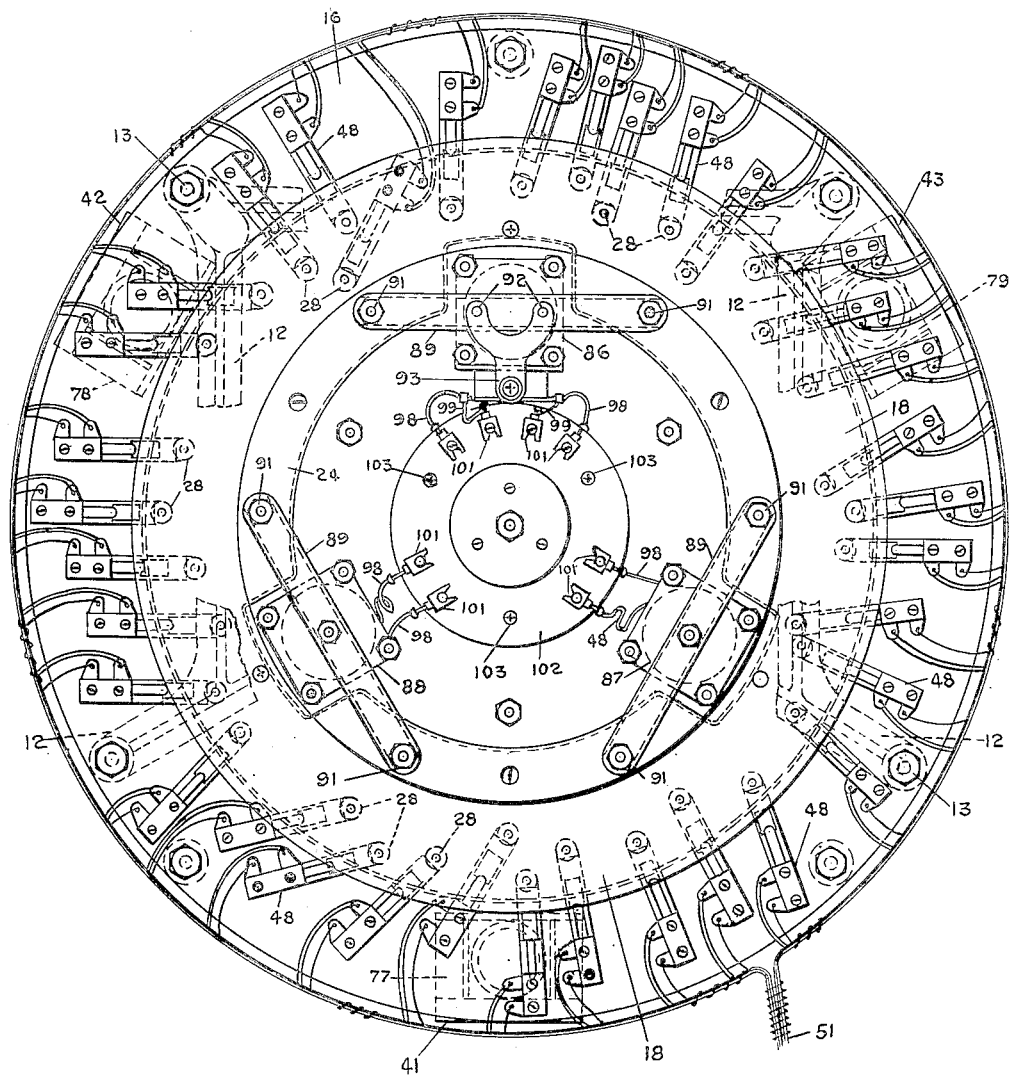
Fig. 1 is a front elevational view of the selector or take-off mechanism which is adapted to be mounted within the dial head of an automatic dial scale.
Figure 2:
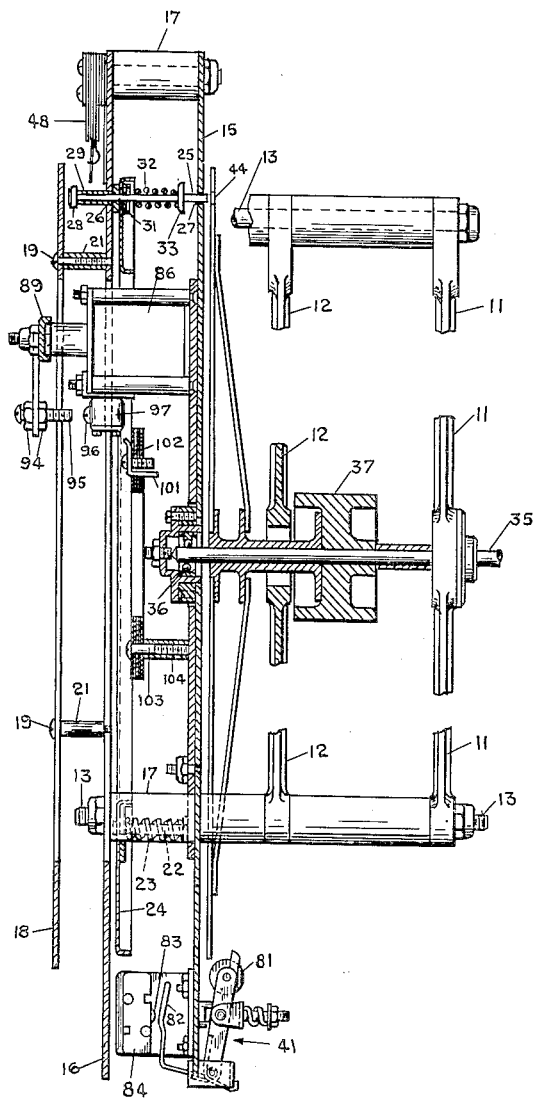
Fig. 2 is vertical cross-sectional view of the selector or take-off mechanism shown in Fig. 1, partly broken away.

Referring to Figs. 1 and 2 of the drawings, the reference numeral 11 indicates the front framework of a dial scale head mechanism and reference numeral 12 the rear framework. In the frameworks 11 and 12 are supported studs 13 on which certain of the elements of the selector mechanism are mounted. Such elements comprise bottom plate 15 and annular top plate 16. These plates are relatively fixed and are separated by spacers 17. A back or bumper plate 18, also annular in form, is attached to top plate 16 by screw bolts 19 but is separated from said top plate by spacers 21. The bottom plate 15 has fixed thereto a plurality of dowel pins 22, only one of which is shown, on each of which is a spring 23. The dowel pins 22 support, for lateral movement relative thereto against the action of springs 23, a flanged substantially annular disc 24 for actuating selector pins 25, only one of which is shown in detail, in Fig. 2.

Selector pins 25 extend through aligned openings 26 and 27 in top plate 16 and bottom plate 15 respectively. A collar 28 and a sleeve 29 are mounted on a portion of the selector pins on one side of the selector pin actuating disc 24, and a relatively movable washer 31, a spring 32 to which said washer is attached, and a fixed washer 33 are mounted on the selector pin on the other side of actuating disc 24.

Figure 5:
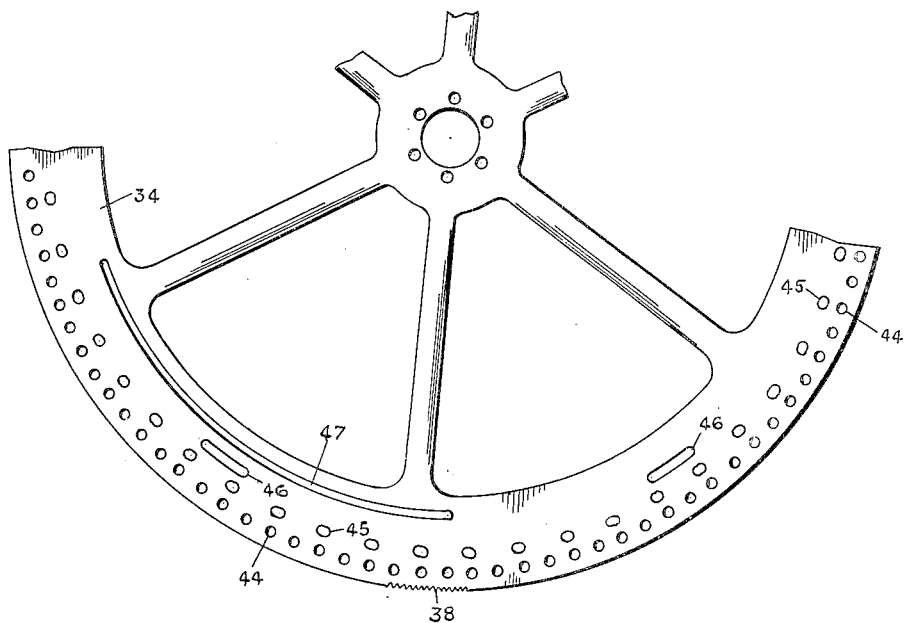
Fig. 5 is a detail view of a portion of the selector disc.
Figure 6:
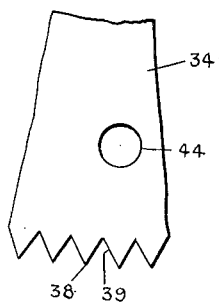
Fig. 6 is an enlarged detail view of a section of the selector wheel.

Cooperating with selector pin 25 is a selector disc 34, as is shown in Fig. 5, which is mounted on the pointer shaft 35 journaled in anti-friction bearings such as bearings 36. The pointer shaft also has mounted thereon a drum 37 which is caused to rotate and to move the selector disc 34 to an angular position corresponding to the weight of the load on the load suport through the medium of the usual dial scale elements or those shown in the dial scale described in the above-mentioned application Ser. No. 646,883.

The selector disc 34 is provided with V-shaped indexing teeth 38 and notches 39 suitably spaced around the periphery of said selector disc, the number of teeth and notches depending upon the graduations on the scale chart. Locking mechanisms, which are generally indicated by references 41, 42 and 43, are equally spaced about the selector disc and cooperate with the teeth and notches in the periphery of the selector disc to hold the same securely in position during a take-off or recording operation. A locking mechanism of the type herein employed is shown and described in detail in application Ser. No. 677,221, filed June 17, 1946, by Lester D. Singleton.

The face of selector disc 34 is provided with three concentric rows of apertures extending circumferentially around the same, and a single arcuate slot extending for a substantial distance along the face of the selector disc concentric with the other apertures. These apertures are adapted to receive four of the selector pins 25 during each take-off or recording operation, one unit pin, one tens pin, one hundreds pin and one thousands pin.

The number of apertures in the face of the selector pins 25 depend on the capacity of the scale and the graduations on the scale dial. Thus here where the dial capacity is taken as 5,000 pounds with graduations of 5 pounds each, the first row 44 (units) will comprise one hundred circular openings, the second row 45 (tens) will comprise fifty oval shaped openings, the third row 46 (hundreds) five slots and the fourth row 47 (thousands) one relatively large arcuate slot. In a scale of the aforesaid capacity, there will be required thirty-five selector pins 25 and a snap-switch 48 to cooperate with each selector pin. As shown in Fig. 1, the snap-switches 48, thirty-five in all, are attached to the annular top plate 16 and are arranged substantially circumferentially thereof. The thirty-five snap-switches 48 are composed, as will appear from Fig. 7, of 10 units switches, 10 tens switches, 10 hundreds switches and 5 thousands switches. Connected to snap-switches 48 are leads 49 which are brought together to form a cable 51 suitably mounted in a cannon type receptacle 52 adapted to receive a cannon type plug 53 electrically connected to the pointing mechanism (not shown) by a multiple conductor cord 54. As is well understood in the art, electric impulses transmitted by the take-off or selector mechanism selectively operates the pointing mechanism.

When a load is placed on the load support of the scale, the selector disc 34 is rotated to an angular position corresponding to the weight of the load, thus bringing certain of the apertures on the face of the selector disc opposite certain of the selector pins 25. To operate the take-off or selector mechanism for selectively transmitting electric impulses to the printing mechanism, switch 55 is operated manually by a push button or automatically as by the insertion of a slip in the printing mechanism.

With the closing of switch 55, four relays, 56, 57, 58 and 59, are energized through suitable electrical connections. These relays together with a dry rectifier 61, capacitor 62 and fuses 63 are, as shown in Figs. 3 and 4, on a plate 64 fixed as by screws 65 to the dial casing 66 adjacent to the multiplying tape sector 67 mounted therein. Attached to plate 64 by screws 68, but spaced therefrom by spacers 69, is a terminal strip 71 on which are mounted terminals 72 for connecting the power and control unit to a source of alternating current, and terminals 73 electrically connecting the power and control unit to the take-off unit. To house the elements of the take-off or selector mechanism, the dial casing 66 is provided with an annular extension 74 provided with a rear cover 75 which may be attached to said extension 74 by means of screws 76.

With the closing of switch 55, the relay 58 functions to initiate the operation of the take-off unit. Relay 56, upon being energized, causes the energization of coils 77, 78 and 79 of the solenoids of the locking mechanisms 41, 42 and 43 respectively, thereby causing the latching wheel 81 of each of the locking mechanisms to engage a tooth 38 or enter notch 39 in the periphery of the selector disc 34, as is more specifically described in said application Ser. No. 677,221, effecting locking the selector disc against movement.

On one of the locking mechanisms, i. e., locking mechanism 41 shown in Fig. 2, there is provided a finger 82 which, upon the operation of the locking mechanism, is caused to operate push button 83 of a switch 84, thus energizing the common lead 85 to all selector pin switches 48. The operation of switch 84 also causes the energization of three pin release magnets 86, 87 and 88, which have suitably fixed thereto bars 89 which are attached, as by screw bolts 91, to flanged disc 24. Thus, the flanged disc 24 is caused to move towards the selector disc 34, thereby moving all of the selector pins 25 towards the selector disc against the action of spring 32 on each selector pin. One pin in each digit group will enter an aperture in the face of the selector disc, the value of the entering selector pins depending upon and dictated by the position of the selector disc which had moved to an angular position corresponding to the weight of the load placed on the scale. The entering selector pins are moved so far forward that the collar 28 on each of the selector pins closes the normally open contacts of their corresponding switches 48 to energize in the printing unit the functional components corresponding thereto.

The bar 89 operatively connected to pin release magnet 86 has attached thereto, as by bolts 92, a bracket 93 having mounted thereon by means of nuts 94 a bolt or pin 95. Energization of pin release magnet 86 causes the pin 95 to operate push button 96 of a switch 97 to close the latter and thus initiate the actual printing operation.

The leads 98 to the pin release magnets 86, 87 and 88 and leads 99 to switch 97 are for convenience connected to terminals 101 on a terminal ring 102 attached to bottom plate 15 by screws 103 but spaced therefrom by spacers 104, only one of the latter being shown.

Relay 57 is a time-delay relay and, as will be seen from Fig. 7, has its normally closed contacts connected in the common lead to relays 56 and 58. Relay 57 is energized during the operation cycle by a normally open contact on relay 56 and is so adjusted as to operate an appreciable time, preferably three or four seconds, after being energized. The function of relay 57 is to clear the entire take-off unit if the said unit fails to complete its operating cycle within the specified time.

Relay 58 besides functioning to initiate the take-off operation also functions as a holding relay, acting to hold the circuits established until cleared by relay 57, or by the operation of the printer unit at the completion of its cycle.

Relay 59 is an auxiliary relay and has its normally closed contact connected in the common lead to relays 56 and 58. The function of relay 59 is to prevent the printing unit from operating, in the event that the scale is loaded beyond its capacity, through Mercoid switches 105 and 106 which may be attached to a suitable scale element such as a pendulum of the dial scale.

The closing of switch 107 will cause the take-off unit to repeat the transmission of electrical impulses to repeat the last print on the printer unit.

While a preferred embodiment of our invention has been shown and described by us, it is to be understood that it is subject to variation, modification and change within the scope of the appended claims.

What is claimed is:

1. In a recording weighing scale of the automatic dial type having a dial scale head mechanism and an electrically controlled selector, comprising a selector disc mounted on the pointer shaft of the dial scale and angularly movable therewith in proportion to the weight of the load being weighed and provided with a plurality of apertures arranged in concentric rows, means for locking said selector disc, an electromagnet for operating said locking means, a plurality of selector pins supported adjacent said selector disc adapted to enter said apertures, an electrical transmitting circuit, having open switches, cooperating with said selector pins, a movable disc for moving all of said selector pins toward said selector disc and to cause one of said selector pins to enter an aperture in each of said rows of apertures and to come into contact with a similar number of said switches to close said switches to effect transmission of electrical impulses, a plurality of solenoids to move said movable disc, and a switch on said locking means for energizing said solenoids.

2. In a recording weighing scale of the automatic dial type having a dial scale head mechanism and an electrically controlled selector, comprising a selector disc mounted on the pointer shaft of the dial scale and angularly movable therewith in proportion to the weight of the load being weighed and provided with a plurality of apertures arranged in concentric rows, means for locking said selector disc, an electromagnet for operating said locking means, a plurality of selector pins supported adjacent said selector disc adapted to enter said apertures, an electrical transmitting circuit, having open switches corresponding in number to the number of selector pins, cooperating with said selector pins, a movable disc for moving all of said selector pins toward said selector disc and to cause one of said selector pins to enter an aperture in each of said rows of apertures and to come into contact with a similar number of said switches to close said switches to effect transmission of electrical impulses, a plurality of solenoids to move said movable disc, a switch on said locking means for energizing said solenoids, a relay for operating said latter switch, and a switch for energizing said relay.

3. In a recording weighing scale of the automatic dial type having a dial scale head mechanism and an electrically controlled selector, comprising a selector disc mounted on the pointer shaft of the dial scale and angularly movable therewith in proportion to the weight of the load being weighed and provided with a plurality of apertures arranged in concentric rows, means for locking said selector disc, an electromagnet for operating said locking means, a plurality of selector pins supported adjacent said selector disc adapted to enter said apertures, an electrical transmitting circuit, having open switches, cooperating with said selector pins, a movable disc for moving all of said selector pins toward said selector disc and to cause one of said selector pins to enter an aperture in each of said rows of apertures and to come into contact with a similar number of said switches to close said switches to effect transmission of electrical impulses, a plurality of solenoids to move said movable disc, a switch on said locking means for energizing said solenoids, and means for moving said selector pins away from said selector disc and said switches cooperating therewith at the completion of an impulse transmitting operation.

4. In a recording weighing scale of the automatic dial type having a dial scale head mechanism and an electrically controlled selector, comprising a selector disc mounted on the pointer shaft of the dial scale and angularly movable therewith in proportion to the weight of the load being weighed and provided with a plurality of apertures arranged in concentric rows, means for locking said selector disc, an electromagnet for operating said locking means, a plurality of selector pins supported adjacent said selector disc adapted to enter said apertures, an electrical transmitting circuit, having open switches corresponding in number to the number of selector pins, cooperating with said selector pins, a movable disc for moving all of said selector pins toward said selector disc and to cause one of said selector pins to enter an aperture in each of said rows of apertures and to come into contact with a similar number of said switches to close said switches to effect transmission of electrical impulses, a plurality of solenoids to move said movable disc, a switch on said locking means for energizing said solenoids, a relay for operating said latter switch, a switch for energizing said relay, spring means for moving said selector pins away from said selector disc and said switches cooperating therewith at the completion of an impulse transmitting operation.

LESTER D. SINGLETON.

REFERENCES CITED

The following references are of record in the file of this patent:

UNITED STATES PATENTS

| Number | Name | Date |
| --- | --- | --- |
| 502,104 | Roe | July 25, 1893 |
| 835,840 | Strassweg | Nov. 13, 1906 |
| 2,163,183 | Baagoe | June 20, 1939 |